United States Patent
Thibadeau

(10) Patent No.: US 7,461,270 B2
(45) Date of Patent: *Dec. 2, 2008

(54) METHODS AND SYSTEMS FOR PROMOTING SECURITY IN A COMPUTER SYSTEM EMPLOYING ATTACHED STORAGE DEVICES

(75) Inventor: Robert H. Thibadeau, Pittsburgh, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 302 days.

This patent is subject to a terminal disclaimer.

(21) Appl. No.: 11/346,118

(22) Filed: Feb. 2, 2006

(65) Prior Publication Data

US 2007/0174920 A1 Jul. 26, 2007

Related U.S. Application Data

(62) Division of application No. 09/912,931, filed on Jul. 25, 2001, now Pat. No. 7,036,020.

(51) Int. Cl.
*H04L 9/32* (2006.01)
(52) U.S. Cl. .................................. 713/193; 713/189
(58) Field of Classification Search .................. None
See application file for complete search history.

(56) References Cited

U.S. PATENT DOCUMENTS 3,576,544 A 4/1971 Cordero, Jr. et al. ..... 340/172.5

(Continued)

FOREIGN PATENT DOCUMENTS

EP 0 965 903 A1 12/1999

(Continued)

OTHER PUBLICATIONS

"TCPA PC Specific Implementation Specification," Version 1.00, Booklet, Sep. 9, 2001. pp. 1-70.

(Continued)

*Primary Examiner*—Pramila Parthasarathy
(74) *Attorney, Agent, or Firm*—Westman, Champlin & Kelly, P.A.

(57) ABSTRACT

The present methods and systems use specially isolated techniques for promoting security in a computer system. In one embodiment of these methods and systems, a simple file system is concealed in the storage of the computer system and is managed with a processor and simple non-writeable code operating on the storage device. Strong cryptographic design permits the present computer security methods and systems to secure data on the storage device. In one method embodiment, a computer system is provided with an operating system in operative association with at least one storage device, wherein the storage device includes firmware and a processor for processing data and instructions stored on the storage device. The method includes creating at least one security partition in, and restricting access to, at least a portion of the storage device by the operating system. The method also includes creating at least one security partition in the storage device. The method also includes providing at least one authority record and data associated with the authority record in the storage device. System and computer-readable medium embodiments structured in accordance with the method embodiments discussed herein are also provided.

14 Claims, 8 Drawing Sheets

U.S. PATENT DOCUMENTS

| | | | |
|---|---|---|---|
| 3,890,601 A | 6/1975 | Pietrolewicz | 340/172.5 |
| 4,183,085 A | 1/1980 | Roberts et al. | 364/200 |
| 4,442,484 A | 4/1984 | Childs, Jr. et al. | 364/200 |
| 5,022,077 A | 6/1991 | Bealkowski et al. | 380/4 |
| 5,027,401 A | 6/1991 | Soltesz | 380/54 |
| 5,101,374 A | 3/1992 | Sinutko, Jr. | 395/725 |
| 5,345,590 A | 9/1994 | Ault et al. | 395/650 |
| 5,394,469 A | 2/1995 | Nagel et al. | 380/4 |
| 5,432,939 A | 7/1995 | Blackledge et al. | 395/700 |
| 5,448,045 A | 9/1995 | Clark | 235/382 |
| 5,504,814 A | 4/1996 | Miyahara | 380/4 |
| 5,623,637 A | 4/1997 | Jones et al. | 395/491 |
| 5,754,821 A | 5/1998 | Cripe et al. | 395/491 |
| 5,892,899 A | 4/1999 | Aucsmith et al. | 395/186 |
| 5,892,902 A | 4/1999 | Clark | 395/187.01 |
| 5,928,364 A | 7/1999 | Yamamoto | 713/202 |
| 5,940,513 A | 8/1999 | Aucsmith et al. | 380/25 |
| 5,949,601 A | 9/1999 | Braithwaite et al. | 360/60 |
| 6,044,349 A | 3/2000 | Tolopka et al. | 705/1 |
| 6,092,202 A | 7/2000 | Veil et al. | 713/201 |
| 6,134,662 A | 10/2000 | Levy et al. | 713/200 |
| 6,138,239 A | 10/2000 | Veil | 713/200 |
| 6,141,752 A | 10/2000 | Dancs et al. | 713/172 |
| 6,173,402 B1 | 1/2001 | Chapman | 713/182 |
| 6,175,924 B1 | 1/2001 | Arnold | 713/189 |
| 6,182,222 B1 | 1/2001 | Oparaji | 713/206 |
| 6,192,472 B1 | 2/2001 | Garay et al. | 713/165 |
| 6,219,726 B1 | 4/2001 | Ripberger | 710/36 |
| 6,219,771 B1 | 4/2001 | Kikuchi et al. | 711/164 |
| 6,253,281 B1 | 6/2001 | Hall | 711/112 |
| 6,268,789 B1 | 7/2001 | Diamant et al. | 340/5.74 |
| 6,321,358 B1 | 11/2001 | Anderson | 714/763 |
| 6,324,627 B1 | 11/2001 | Kricheff et al. | 711/163 |
| 6,336,187 B1 | 1/2002 | Kern et al. | 713/161 |
| 6,360,945 B1 | 3/2002 | Drew | 235/382 |
| 6,446,209 B2 | 9/2002 | Kern et al. | 713/193 |
| 6,468,160 B2 * | 10/2002 | Eliott | 463/43 |
| 6,691,198 B1 | 2/2004 | Hamlin | 710/305 |
| 6,707,548 B2 | 3/2004 | Kreimer et al. | 356/301 |
| 2002/0077177 A1 | 6/2002 | Elliott | 463/40 |
| 2002/0136406 A1 | 9/2002 | Fitzhardinge et al. | 380/210 |
| 2002/0157010 A1 | 10/2002 | Dayan et al. | 713/191 |
| 2003/0023867 A1 | 1/2003 | Thibadeau | 713/200 |
| 2004/0073795 A1 | 4/2004 | Jablon | 713/171 |
| 2005/0177714 A1 | 8/2005 | Jeong et al. | 713/155 |
| 2005/0210266 A1 | 9/2005 | Cottrell et al. | 713/185 |

FOREIGN PATENT DOCUMENTS

| | | |
|---|---|---|
| JP | 5134863 A2 | 6/1993 |
| JP | 8115266 A2 | 5/1996 |
| WO | WO 99/59049 | 11/1999 |

OTHER PUBLICATIONS

Gobioff, H. et al.; "Security for Network Attached Storage Devices," School of Computer Science, Carnegie Mellon University, Oct. 23, 1997. pp. 1-18.

"Trusted Computing Platform Alliance (TCPA)", Main Specification Version 1.1a, Booklet, Nov. 12, 2001, pp. 1-321.

"Intel® Protected Access Architecture," Application Interface Specification Revision 1.0, Booklet, Mar. 2001. pp. 1-128.

Strunk, J. D. et al.; "Self-Security Storage: Protecting Data in Compromised Systems," 4th Symposium on Operating Sytems Design and Implementation, Oct. 2000, pp. 1-15.

Tao et al., W.; "Research on a Dedicated CPU Architecture for Java IC Card," ACTA Electronica Sinica, vol. 28, No. 11, Nov. 2000, pp. 77-80, 76. Chinese Inst. Electron, China.

"Public Protection of Software," ACM Transactions on Computer Systems, vol. 5, No. 4, Nov. 1987, pp. 371-393.

"Protection and Control of Information Sharing in Multics," Communications of the ACM, vol. 17, No. 7, Jul. 1974.

Wilkes, M. V.; "Hardware Support for Memory Protection: Capability Implementations,", Digital Equipment Corporation.

Brenner, R.; "Smart Cards with Built-In Microprocessors: Partition into Virtual Cards," Elektronik, vol. 43, No. 9, May 3, 1994, pp. 38-44, Germany.

"Secur'Acces: access control with the CP8 smart card", Securicom 87, 5th Worldwide Congress on Computer and Communications Security and Protection.Sedep. 1987, pp. 187-196, Paris, France.

"Memory Protection Software Facility for OS/2 Shared Data Applica-tions", IBM Technical Disclosure Bulletin, pp. 81-89, Sep. 1991.

"Modular System Partition," IBM Technical Disclosure Bulletin, pp. 341-342, Dec. 1992.

"Preventing Access to a Personal Computer," IBM Technical Disclosure Bulletin, pp. 98-100, Sep. 1992.

"Password Protection of Separate Hard Disk Partitions," IMB Technical Disclosure Bulletin, pp. 103-104, Nov. 1996.

"TCPA PA Specific Implementation Specification," Version 1.00, Sep. 9, 2001.

Gobioff H. et al., "Security for Network Attached Storage Devices," School of Computer Science, Carnegie Mellon University, Oct. 23, 1997.

Strunk, J. D. et al., "Self-Security Storage: Protecting Data in Compromosed Systems," 4th Symposium on Operating Systems Design and Implementation, Oct. 2000.

"Trusted Computing Platform Alliance (TCPA)," Main Specification Version 1.1a, Nov. 12, 2001.

"Intel® Protected Access Architecture," Application Interface Specification, Revision 1.0, Mar. 2001.

M. V. Wilkes "Hardware Support for Memory Protection: Capability Implementations", Digital Equipment Corporation.

* cited by examiner

FIGURE 5

| Field | N | Bit Size | Byte Size | Note | Authority Source (See AuthSet Call) | | |
|---|---|---|---|---|---|---|---|
| | | | | | Internal | External | Root |
| SPName | 1 | 256 | 32 | First Byte Null | InFrom Set | InFrom Set | InFrom Set |
| SPPasscode | 1 | 128 | 16 | | InFrom CSet, Hidden | InFrom CSet, Hidden | InFrom CSet, Hidden |
| SPPublicKey-Out | 1 | 4096 | 512 | | OutFrom Set | InFrom CSet, OutFrom Set | OutFrom Set |
| SPPrivateKey-Out | 1 | 4096 | 512 | | Hidden | InFrom Set, Hidden | Hidden |
| SPPublicKey-In | 1 | 4096 | 512 | | OutFrom Set | InFrom Cset | OutFrom Set |
| SPPrivateKey-In | 1 | 4096 | 512 | | Hidden | InFrom CSet, Hidden | Hidden |
| SPSymKey | 1 | 1024 | 128 | | Hidden | InFrom CSet, Hidden | Hidden |
| SPNonce | 1 | 2048 | 256 | avoid replay attacks | In \| Out from Set | In \| Out from Set | In \| Out from Set |
| SPAuthSource (Internal \| External \| Special) | 1 | 2 | 0.25 | | Not Applicable | Not Applicable | Not Applicable |
| SPDataWriteMode (WriteOnce \| WriteOver \| WriteAny) | 1 | 2 | 0.25 | | InFrom Set | InFrom Set | WriteAny |
| SPDataReadMode (ReadCur \| ReadAny \| Hidden) | 1 | 2 | 0.25 | | InFrom Set | InFrom Set | ReadAny |
| SPDataEncrypt (YES \| NO) | 1 | 1 | 0.125 | | InFrom Set | InFrom Set | InFrom Set |
| SPStartTime | 1 | 128 | 16 | | InFrom Set | InFrom Set | InFrom Set |
| SPEndTime | 1 | 128 | 16 | | InFrom Set | InFrom Set | InFrom Set |
| SPEraseAtExpiration (YES \| NO) | 1 | 1 | 0.125 | | InFrom Set | InFrom Set | InFrom Set |
| SPNumberofRecords | 1 | 64 | 8 | | InFrom Set | InFrom Set | InFrom Set |
| SPRecordSize | 1 | 64 | 8 | | InFrom Set | InFrom Set | min 3270 |
| SPCurrentRecord | 1 | 64 | 8 | | InFrom Set | InFrom Set | -1 |
| SPDataStart (an absolute disk address) | 1 | 768 | 96 | | Hidden | Hidden | Hidden |
| SPAuthority SPName (reader, writer, admin, encrypted passcode, certIN, certOut)* | 64 | 32 | 256 | First Byte Encodes REQUIRES | InFrom Set | InFrom Set | (1,1,1,1,1,1,...) |
| Total Bytes in One Auth Record | | 21,096 | 2,889 | | | | |
| Rounded Up | | | 3,072 | 6 Disk Blocks | | | |
| SPData (the disk address for this is usually not contiguous with the authority record). | | SPRecSize * NumRecs | 193,536 is 3,072*63 for the Root Data | Other Authorities will have other Sizes | | | |

FIGURE 6

| Field | Bits | Bytes | Example | Notes | |
|---|---|---|---|---|---|
| SPMagic | 32 | 4 | xF27F | | |
| SPOffset | 32 | 4 | 1844 | header size may increase by more than one disk begin-end storagelimit item | |
| SPVersion | 32 | 4 | 1.01 | text | |
| SPCryptoSuite | 128 | 16 | RSA+RAJD++ | text | Fixed in the Preferred Embodiment |
| SPVendor | 128 | 16 | Foobar Corp. | text | |
| SPNumAuths | 32 | 4 | 64 | | |
| SPAuthSize | 32 | 4 | 6 | In 512 Byte Blocks | |
| SPRootPublicKeyIn | 4096 | 512 | | | From Root Auth Record |
| SPRootNonce | 2048 | 256 | | | Synthesized on demand |
| SPStorageLimits | 8192 | 1024 | | Begin/End Absolute Disk Locations | Synthesized from Auth Records |

Note: Authority Partition Header is typically not writeable.

FIGURE 7

| Call | Arguments | | | | | Notes | |
|---|---|---|---|---|---|---|---|
| Calls that Read and Write Authority Records | | | | | | | |
| SPAuthHeader | AuthHeader | | | | | Returns Header | |
| SPSet | Name | Passcode CertIN | CertOut | AuthRecord | View \| Modify \| Add \| Delete | Sets values for an authority | requires Admin priviledge |
| SPCSet | Name | Passcode CertIN | CertOut | AuthRecord | View \| Modify \| Add \| Delete | Secure Setting of values for authority, utilizes public key | requires Admin priviledge |
| Calls that permit conventional Read and Write of Authority Data Records | | | | | | | |
| SPOpen | Name | Passcode CertIN | CertOut | AuthRecord | Duration in Microseconds | Opens an SDpartition for authorized read and write | |
| SPClose | Name | Passcode CertIN | CertOut | AuthRecord | | Closes an Sdpartition for authorized read and write | |
| Calls that utilize SP's ability to hide secrets and hide basic cryptography | | | | | | | |
| SPSignThis | Name | Passcode CertIN | CertOut | DatatoSign | PrivateKeyLocation | SignedData(returned) | |
| SPCheckThis | Name | Passcode CertIN | CertOut | DatatoCheck | PrivateKeyLocation | Check(returned) | |
| SPProtRead | Name | Passcode CertIN | CertOut | Data (returned) | MyPublicKey | Location | |
| SPProtWrite | Name | Passcode CertIN | CertOut | Data | MyPublicKey Location | Location | SPSuccess (returned) |
| SPHashThis | Name | Passcode CertIN | CertOut | DatatoHash | Hash (returned) | Location to Store | |

Note.: Locations above are possibly complex in that they can specify other authority records that this authority has the right to read or write. So the location may be Name:RecordNumber, in general.

FIGURE 8

| Error | Code | Notes |
|---|---|---|
| SPSuccess | 0 | |
| SPBad CertificateIN | 1 | Certificate In Failure |
| SPBad CertificateOUT | 2 | Certificate Out Failure |
| SPBad Name | 3 | Name not found |
| SPBad Passcode | 4 | Passcode failed |
| SPNo PublicKey-Out | 5 | For External Authority |
| SPNo Publickey-In | 6 | For External Authority |
| SPNo PrivateKey-Out | 7 | For External Authority |
| SPNo PrivateKey-In | 8 | For External Authority |
| SPNoAuthority | 9 | You can't do this |
| SPPartition Full | 10 | The SP Partition is Full and writeover is not turned on |
| SPNo Space For Partition | 11 | You can't create this partition, no continuous space |
| SPNo Security Support | 12 | SP Security Turned off on this device - Header Fail |
| SPRead Failure | 13 | Special SP Read Failed |
| SPWrite Failure | 14 | Special SP Write Failed |

METHODS AND SYSTEMS FOR PROMOTING SECURITY IN A COMPUTER SYSTEM EMPLOYING ATTACHED STORAGE DEVICES

The present application is a divisional of and claims priority from U.S. patent application Ser. No. 09/912,931, filed Jul. 25, 2001, now U.S. Pat. No. 7,036,020 the content of which is hereby incorporated by reference in its entirety.

BACKGROUND OF THE INVENTION

1. Field of the Invention

The present invention generally relates to methods and systems for securing computer systems. The present invention more particularly relates to methods and devices for securing information in a computer system wherein the computer system may be connected to a networked environment.

2. Description of the Related Art

With the advent and widespread deployment of the Internet, conventional computer security systems have been found to be deficient. A disadvantage of the Internet is that it permits many ways to infiltrate conventional computer system perimeter defense systems. Damaging virus programs, for example, can be injected through firewalls and into a computer system. This can compromise data and computer programs, and therefore derivative capabilities such as digital rights management.

This deficiency in computer system perimeter defenses creates the need to position security defense systems in the local computer system. A conventional example of such localized computer system security is virus detection software. Virus detection software, however, can be susceptible to many exploits including, but not limited to, "spoofing" or "wrappering" strategies. Consequently, virus detection software may be made to appear operational when it is not properly operating.

Perhaps the greatest fundamental problem with conventional computer security systems is that their operation is common to the environment of the operating system environment. Furthermore, the operating system environment for many computer systems is also common to the Internet environment, for example, or another network communications medium. Because of this common environment, many means of attack on a computer system are available merely by moving computer code from the Internet to the computer operating system.

Some conventional methods of computer protection may involve special purpose security hardware or firmware installed in the BIOS of a computer system. These methods can establish secondary lines of defense internal to operation of a computer system but external to the complicated and error-prone operating system environment. However, these methods often fail to recognize that a better line of defense could be realized with non-writeable firmware in the attached storage devices that provide the bulk of data and code storage for computer systems.

Other conventional computer security systems may include a security device connected to an SCSI bus that protects storage devices on the bus. This type of security system recognizes that the storage device is more secure while not operating in an environment common to the operating system. However, the SCSI bus of this system exposes all devices on the bus, including the storage devices, to access and therefore requires intimate operating systems involvement. It would be an improvement over this technique to put the security measures in the attached storage firmware and data storage. The same solution could also then be applied in SCSI environments and other environments such as ATA storage device environments.

Still other computer security systems recognize the benefit of guarding the storage device at the controller level but are based on shared private keys. Shared private keys are well-known to provide less security than securing and concealing elements of public-private key encryption, because authentication keys are shared and not private to a single device. This type of system is also directed to modification of the file management system of the computer operating system and therefore suffers the same problem of operating system dependence illustrated above for SCSI security. An improved computer security system could leave the operating system file management intact while maintaining separate control over security through a special security interface to the attached storage device.

In another type of computer security system, the security perimeter consists of self-contained software that exports only a simple storage interface for external access and verifies the integrity of each command before processing the command. By contrast, most file servers and client machines execute a multitude of services that are susceptible to attack. Since this self-securing storage device is a single-function device, the task of making it secure is made easier. However, the objective of this system is to provide for automated recovery to a known good state relying on the previous secure storage mechanisms. This type of system also requires operating systems modification. It incorporates complexity, and therefore vulnerability, approaching that of an operating system, and permits opportunities for the introduction of Trojan horses, for example, into the system. Furthermore, this type of system does not recognize the improved security afforded by using the storage device for hiding and securing public-private key operations.

Security afforded to a computer system by the ATA Host Protected Area security protocol can be provided by a method used in connection with readying a storage device during the boot phase of a computer system. In this method, the storage device can be declared to the operating system to have less storage space than the storage device actually has ready for use by the operating system. Special BIOS firmware or other special code can have exclusive access to the undeclared portion of storage space. As an additional security measure, the ATA Host Protected Area can require passcode access to this additional amount of storage space. The ATA Host Protected Area was originally designed to provide security assurance in the form of enhanced operating system and application crash recovery efficiencies. A known good version of the system or application software could be cached in a location outside the capability of the operating system to address. In practice, this restricts access to a portion of the storage device to a computer program running either in the main device firmware or in the operating system environment.

A problem with the ATA Host Protected Area protocol is that it is still possible to intercept communications with the storage device that contain critical information. The hidden ATA Host Protected Area partition of the storage device can be revealed, for example, by putting that same disk drive into another computer that does not reserve the Host Protected space. The passcode, if used, is not retained across power cycles. The ATA Host Protected Area, in practice, is an acceptable place to protect local backup code and data from virus-like infections but is typically not the best place to conceal data. Furthermore, the only authentication required by ATA Host Protected Area is a "first come first served, winner take all" type of device authentication. Public-private key techniques applied to sections of secure data storage would provide an improvement in this type of security.

Therefore, computer security methods and systems are needed that address the aforementioned shortcomings in the art. Method and system approaches are needed in the storage device environment that provide resistance to unauthorized access and use of computer programs and data. Methods and systems are needed that permit sections of the storage device to store data that are not available to the file system or operating system in a computer system for reading or writing operations, except under controlled and cryptographically-guarded conditions. Such controlled conditions should include device authentication and user authentication of secured datasets performed externally to the operating system of the computer system. Methods and systems are also needed that provide firmware and storage devices with controls on access, storage and retrieval of data. These controls should not be able to be written by any process available to the computer system and should be localized in the attached storage device.

SUMMARY OF THE INVENTION

The present methods and systems use simple but effective means for promoting security in a computer system. In one embodiment of these methods and systems, a simple file system is concealed in the computer system and is managed with a processor and simple non-writeable code operating on a storage device. This simplicity of design provides the present computer security methods and systems with means for securing data on the storage device.

In one method embodiment, a computer system is provided with an operating system in operative association with at least one storage device, wherein the storage device includes firmware and a processor for processing data stored on the storage device. The method includes creating at least one security partition in, and restricting access to, at least a portion of the storage device by the operating system. The method also includes creating at least one security partition in the storage device. The method also includes providing at least one authority record and data associated with the authority record in the storage device.

System and computer-readable medium embodiments structured in accordance with the method embodiments discussed herein are also provided.

BRIEF DESCRIPTION OF THE DRAWINGS

FIG. 5 is a tabulation showing portions of an authority record provided in accordance with the present computer security methods and systems;

FIG. 6 is a tabulation showing a partition header provided in accordance with the present computer security methods and systems;

FIG. 7 is a tabulation showing basic storage device procedures provided in accordance with the present computer security methods and systems; and, FIG. 8 is a tabulation of error codes that can be generated in accordance with the present computer security methods and systems.

DETAILED DESCRIPTION

Overview

As used herein, "computer systems" include, but are not limited to, desktop computer systems, laptop computer systems, networked computer systems, wireless systems such as cellular phones and PDA's, digital cameras including self-contained web-cams, and/or any reasonable combination of these systems and devices.

As used herein, the terms "storage device" and "disk drive" or "disk" are interchangeable, except where otherwise noted, and include any device for storage of data in a computer system in accordance with the computer security methods and systems discussed herein. Notwithstanding the use of the term "disk" the storage device need not necessarily incorporate a physical "disk" but preferably incorporates a place for storage managed by a controller with firmware.

It can be appreciated that the term "partition" is used in certain embodiments herein to mean a contiguous grouping of 512 byte blocks as allocated by the low-level formatting of the storage device.

Special security partitions and the structures and processes that support these security partitions are included in the present computer security methods and systems. A primary objective of the present methods and systems is to provide a computer security system that is substantially not dependent on an operating system.

Figure 1:
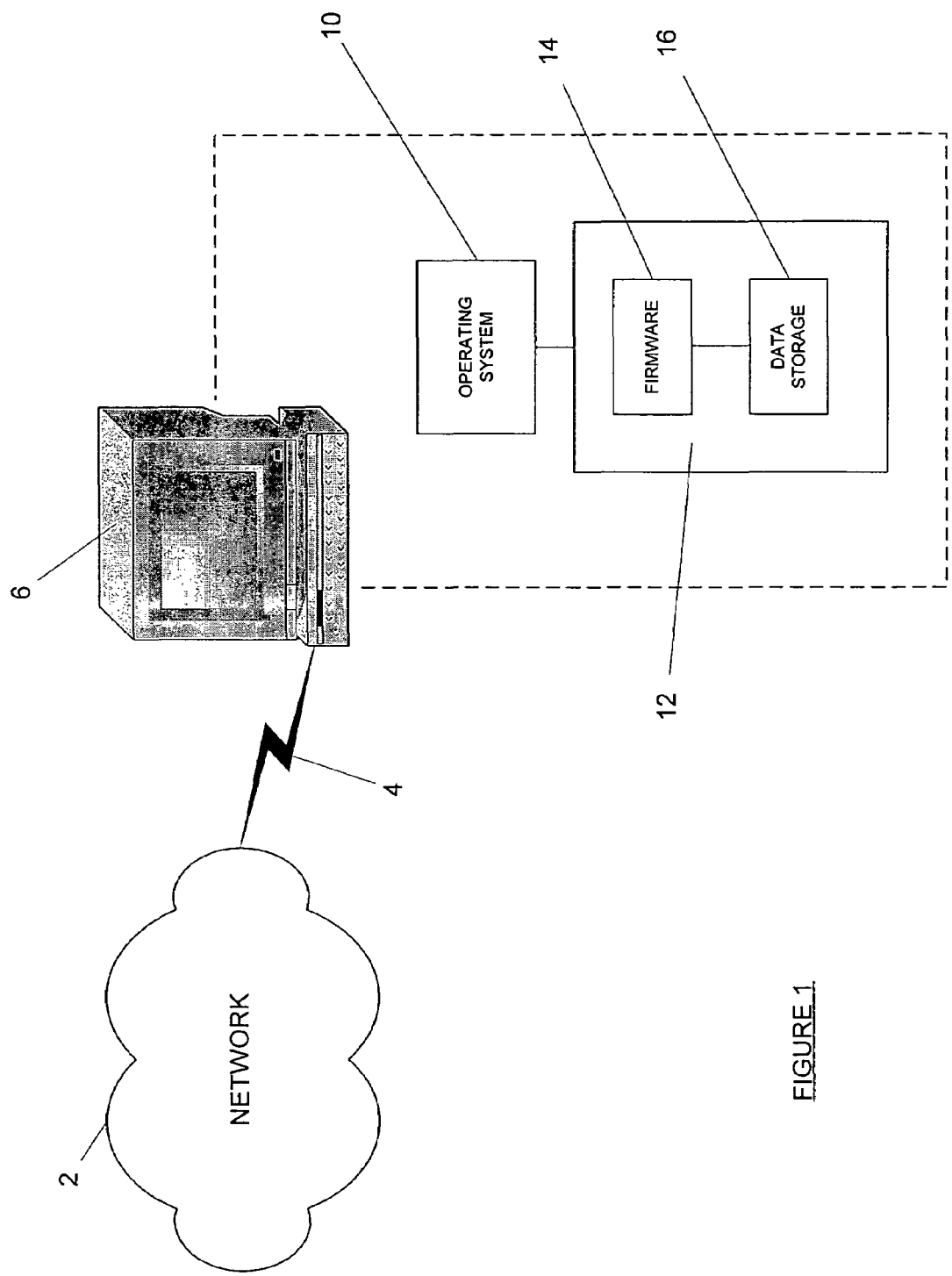
FIG. 1 is a diagram showing a system configured in accordance with methods and systems for promoting computer security.

Referring now to FIG. 1, the architecture of a network-attached device consistent with the methods and systems discussed hereinafter is shown. The network 2, which can be the Internet or another network communications medium, is connected by a wireless or wired (not shown) connection 4 to the computer system 6 of a user. Inside of the computer system 6 is an operating system 10, which relies at least in part on software and data obtained from a storage device 12.

Figure 2:
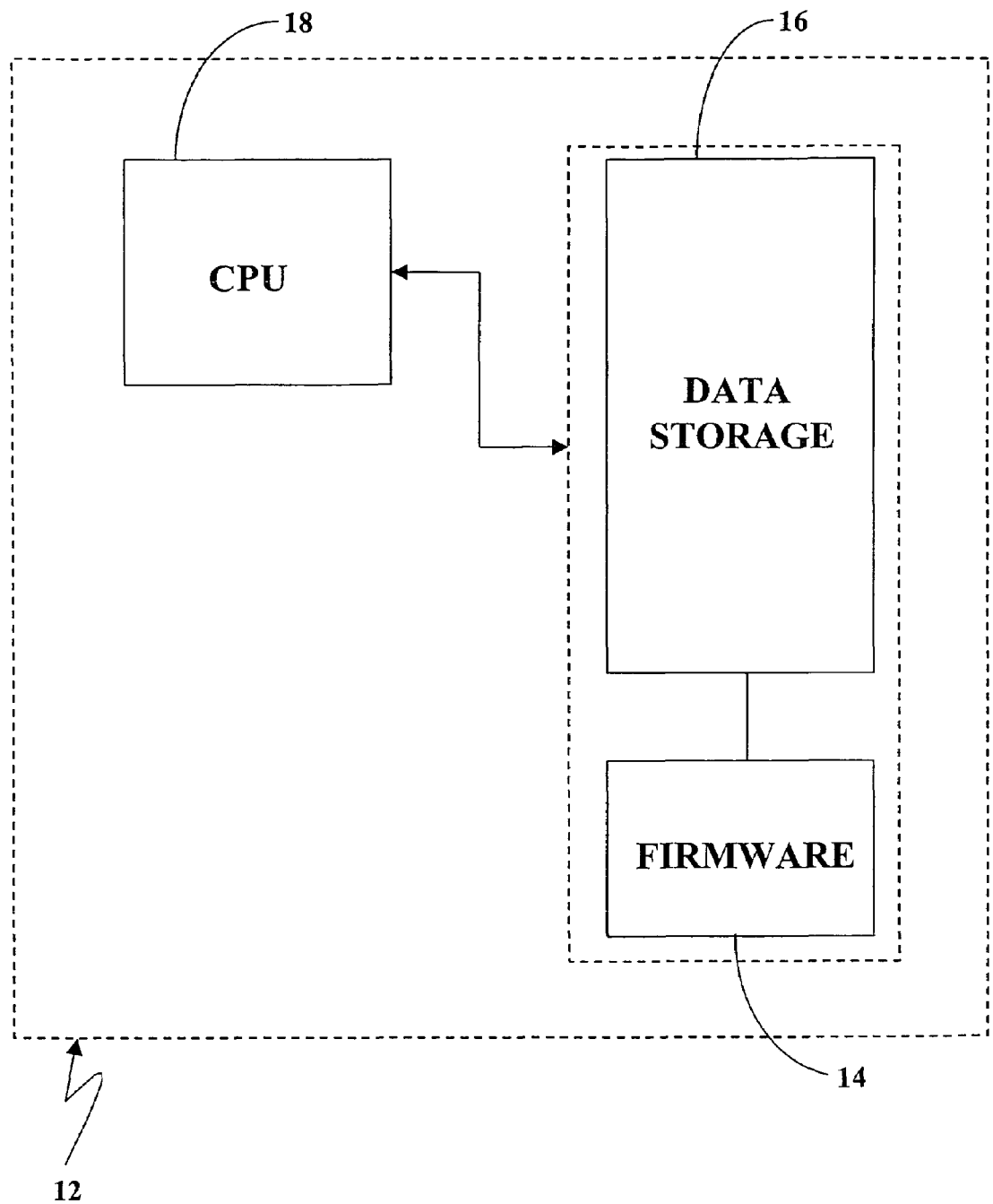
FIG. 2 is a schematic showing details of the storage device of FIG. 1.

Referring now to FIGS. 1 and 2, a more detailed schematic of the storage device 12 is shown in FIG. 1. The storage device 12 contains firmware 14 that reads and writes data from a data storage portion 16 of the storage device 12. It can be appreciated that at least a portion of the storage device firmware 14 can be re-written by software executed in the operating system 10. This portion of the storage device firmware 14 that can be written can be considered writeable firmware ("WF"). In contrast, at least a portion of the storage device firmware 14 is written by using one or more of a plurality of conventional hardware methods that resist this firmware from being written by the operating system 10. This portion of the storage device firmware 14 that cannot be written can be considered non-writeable firmware ("NWF"). In one embodiment, the storage device 12 can also include a separate central processing unit 18 ("CPU") for directing the firmware 14 to access and otherwise manipulate data in the data storage portion 16 of the storage device 12. It can be made a requirement that no data can be transported to or from the data storage portion 16 of the storage device 12, except in connection with execution of the NWF or WF.

For purposes of illustration, some examples of NWF and WF firmware can be derived in connection with the ATA and SCSI disk controller protocols. At least portions of these protocols relate to connectivity between the operating system and the data storage components of a computer system. The ATA protocol, for example, permits customization of commands, such as controller commands, by a user. In one embodiment, the present computer security methods and systems offer an addition to the ATA/ATAPI-5 ANSI specification, NCITS 340-2000. However, it can be appreciated that parallel, analogous additions can be made by the methods and systems addressed herein to the SCSI specification and other suitable disk controller specifications that allow, for example, vendor-specific or standards-driven extensions. It can also be understood that the methods and systems discussed herein can form the basis for a component part of a new disk controller specification.

Data storage, as applied herein, can be provided in connection with a conventional disk controller protocol such as ATA or SCSI. One type of security protocol available to ATA, in particular, is known to those skilled in the art as ATA Host Protected Area. Mapped-out storage, as applied herein, is storage space that is mapped-out by tables in the NWF and WF to indicate bad sectors. It is understood that other data can be mapped out of the writeable storage by the disk controller for the storage device.

Figure 3:
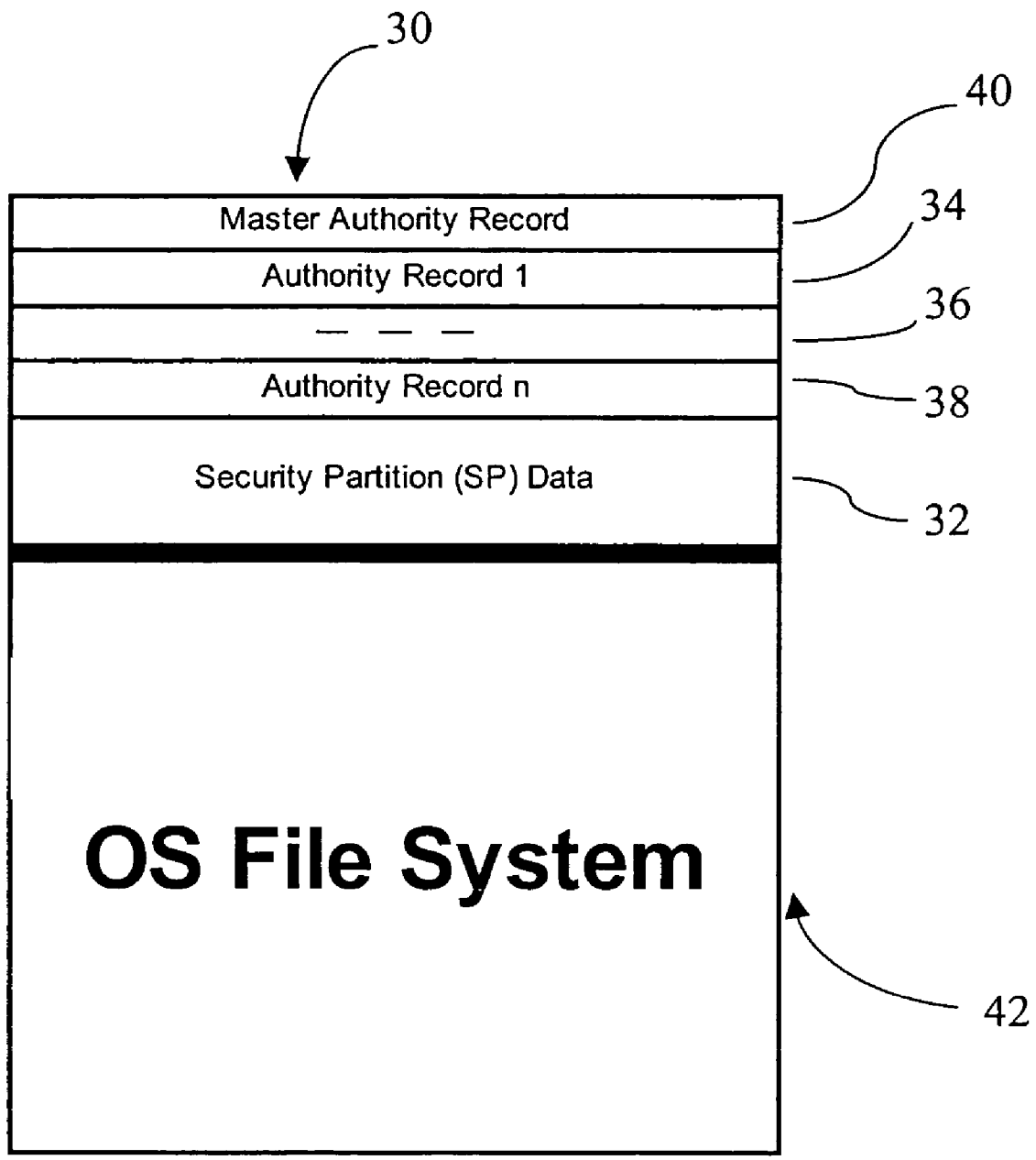
FIG. 3 is a schematic illustrating the interaction between a storage device and an operating system file system of a computer system in accordance with methods and systems for promoting computer security.

Referring now to FIG. 3, the present computer security methods and systems can augment existing ATA and SCSI protocols, for example, with simple and effective enhanced security protocols. The methods and systems include a storage device 30 having security partition ("SP") data 32 and at least one authority record, such as authority record 34, associated with the security partition data 32. These security partition data 34 and authority records 34, 36, 38 are contained in a security partition of the storage device 30. The present methods and systems provide a relatively simple file system located on the low-level formatting of the storage device 30. The growth of data added to the storage device 30 proceeds from top to bottom, as shown in FIG. 3, so that a query of the storage device 30 contents can readily reveal how much data storage space remains for use.

Operations involving the authority records 34, 36, 38 are managed by the firmware of the storage device 30. In one embodiment, all authority records 34, 36, 38 can be governed by a single master authority record 40. As shown, an operating system ("OS") file system 42 is not permitted to access the security partition data 32 contained in the storage device 30. This independence of the security partition data 32 from the OS file system 42 provides an important benefit of the present security methods and systems: to create a location on a computer system where information such as a secret can be effectively concealed.

Figure 4:
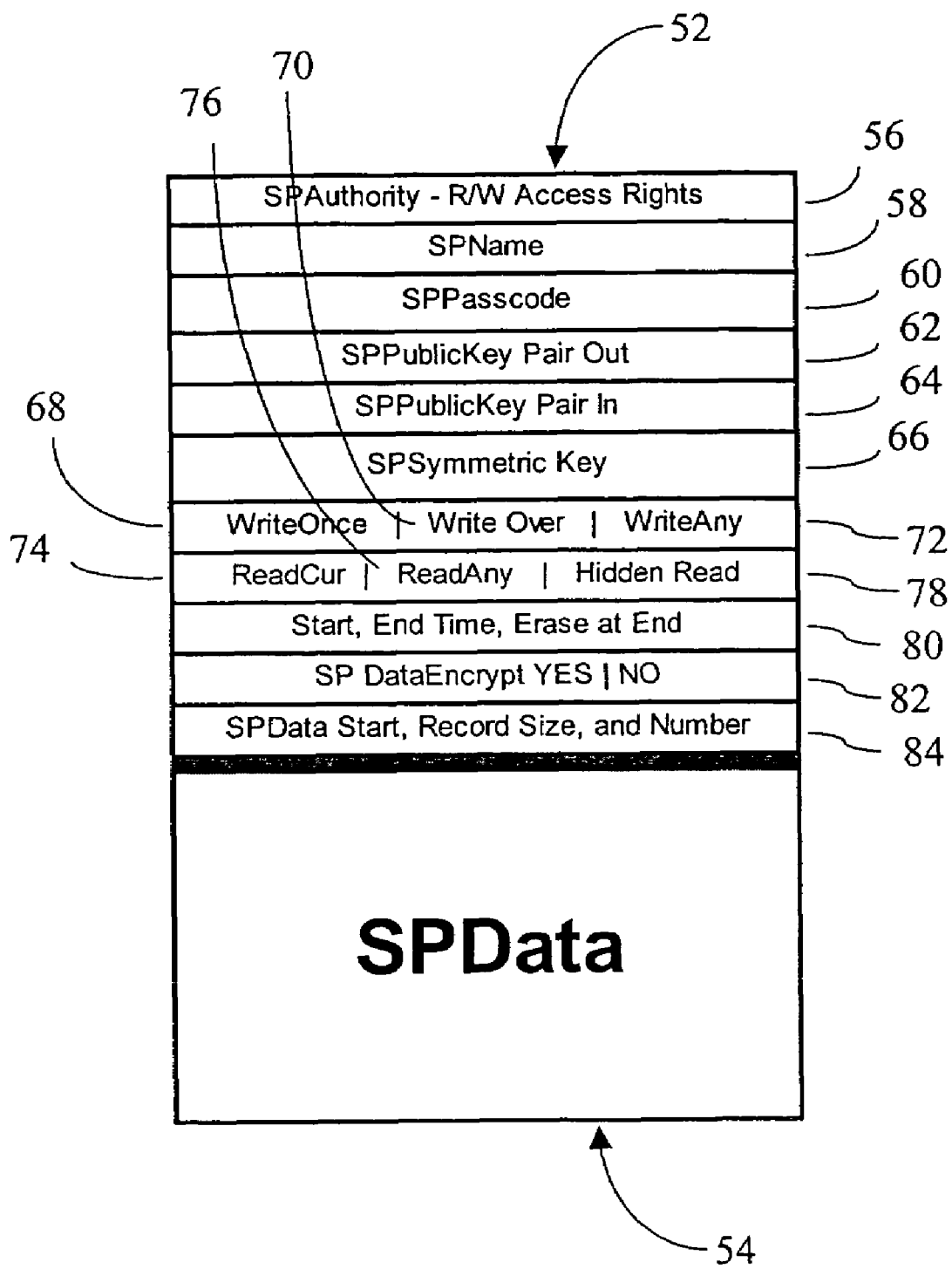
FIG. 4 is a schematic showing details of the authority records and security partition data shown in FIG. 3.

Referring now to FIG. 4, a schematic of an authority record 52 is presented in accordance with the authority records 34, 36, 38 of FIG. 3. The authority record 52 can include data, computer programs, and other like information and functionality in association with the SP data 54 corresponding to the authority record 52. The contents of the authority record 52 and the SP data 54 (elements 56 through 84) are related to information for which concealment is desired and/or functionality that promotes secure data processing in a computer system. Types of information that can be stored in SP data 54 and types of secure processing functions performed by the authority record 52 in connection with the SP data 54, as indicated in elements 56 through 84, are presented below as examples.

It can be seen that there are many advantages to a closed, non-expandable, storage and authority system as described herein. The storage device can define, for certain data on the disk, a structure for authorization and authentication that can be readily inspected and audited. If authorization and authentication functions are not provided in a closed system, then a computer system is generally more vulnerable to attack and infiltration. It can be appreciated that 63 user-definable authority records and one master record are likely to suffice for most practical applications of the present computer security methods and systems. Because these methods and system is are storage device specific lines of security defense, a single authority can translate to a group authority in the operating system environment or an entire domain authority. Since the authorities can be created and deleted by the user as needed, with the understanding that a master authority record can govern these user modifications, the present methods and systems provide an appropriate line of defense for the computer system.

EXAMPLES

The following examples are intended to illustrate potential implementations of the present computer security method and system embodiments. It can be appreciated that such examples are intended primarily for purposes of illustration. No particular aspect or aspects of the method and system embodiments described herein are intended to limit the scope of the present invention. For example, it can be appreciated that a particular choice of nomenclature for security partition commands executed by the present computer security methods and systems are for illustration purposes and are not intended to limit the scope of the present invention.

FIGS. 5 through 8 outline illustrations of the data content and structure, basic procedures, and error codes for the present computer security methods and systems.

FIG. 5 shows the fields of a single authority record followed by the data associated with the authority record. An authority record defines one authority (e.g., a user, group, domain, or other agent) and a data set for which the authority record administers access protections.

FIG. 6 shows the header for the partition containing the master authority record and its data, which comprises all other authority records for the storage device. This header provides information to the computer system for efficient use of the security partition, authority records and their associated SP data.

FIG. 7 shows the basic storage device procedures associated with the present computer security methods and systems. These basic procedures include methods for setting up new authority records, deleting data and/or modifying previous authority records. Also shown are procedures for using the security features built into one or more user applications.

FIG. 8 shows sample error codes that may result from application of the various procedures described in FIG. 7.

As applied to the present computer security methods and systems, reading and writing data to a secured data partition can use conventional read/write mechanisms and protocols. In one aspect, if a read or write of a security partition is attempted, the security partition can be opened using a security partition open call, such as the SPOpen command. Once open, the security partition remains open until closed (such as by use of the SPClose command) or until expiration of a predetermined time interval. An SPOpen command can limit read and write access in many ways that are important to security functions needed for the storage device. In another embodiment, specialized SP, fixed-length and record-oriented, read and write operations are permitted that do not leave open the windows of opportunity that the global SPOpen command can permit.

In some embodiments, the SPOpen and SPClose commands are not available due to security or efficiency considerations and read and write operations are performed through the available SPProtRead and SPProtWrite commands. Use of the SPProtRead and SPProtWrite commands can perform an internal, hidden, SPOpen functionally equivalent action without exposing the secure data to user interaction.

In certain embodiments, the present computer security methods and systems can use, for example, ANSI X.509 certificates that can employ trap-door cryptographic algorithms such as the well-known RSA algorithm for authentication. Each authority record can contain one public-private key pair for authenticating data that originates from the security partition of interest. A second public-private key pair is provided to ensure that data can only be sent to the particular security partition and no other location for storage. These key pairs are associated with X.509 Cert-In (i.e., the data are only transmitted to the desired partition) and X.509 Cert-Out (the data are signed and thereby authenticated to come only from the desired partition). A symmetric key can be used in a way substantially similar to SSL and other equivalently secure streaming protocols to encrypt the data. In this embodiment, the public-private keys are used primarily for the hashes associated with the certificates, although a private key can decode a passcode directed to an authority.

The present methods and systems can require that the above-mentioned cryptographic operations are embedded in the firmware or physical storage of the storage device. The cryptographic code is authenticated with a root assurance in the NWF of the device. In this manner, access to reading or writing SP-protected data cannot be susceptible to attack except by physically modifying the storage device. The SP system also provides for encrypting data in the data partition. The encryption utilizes the symmetric key. If encryption is turned off, then the data in the storage device are plain text even though the symmetric encryption may not have been employed in transmitting the data to and from its storage location. If encryption is turned on, then the data in the storage device are encrypted even though the symmetric encryption may not have been employed in transmitting the data to and from its storage location.

If the SP data are encrypted and the authority source is external, a method and system can be provided to encrypt data on the storage device so that only an external agent can decrypt the data. The SP DataEncrypt command encrypts the SP data so that a key can be acquired and applied from an external source.

In this embodiment, there is no accessible method for decrypting the data from the storage device based on information available in the storage device. This method and system involves securely transmitting the public key and symmetric key. The private key is provided to decrypt the symmetric key when the symmetric key is needed for use in encrypting or decrypting data. This public key/symmetric key/private key arrangement is a conventional method for providing file encryption. The present computer security methods and systems improve this conventional method by providing for security methods and systems contained only in the storage device and not as part of an operating system or file system.

Another feature of the authority record that controls the reading and writing of data in a security partition is that certain fields of the authority record can be hidden. "Hidden" typically means that the values in these fields cannot be read by any external process, i.e., the values cannot be read either by a call to the firmware or by direct examination of the contents of the storage device. There are a plurality of known hardware techniques by which storage can be protected: for example, mapping out the address space of such storage except to the NWF. Another technique that can be applied in connection with the passcode field of the authority record is to store only a hash of code. This technique is possible because there is no requirement to read a plain text passcode. In addition, another technique is to hide a symmetric key by encrypting the key with an authority's public key, such that only the hidden private key can decode it.

In practice of the present computer security methods and systems, a distinction can be made between an external authority source and an internal authority source. If a security partition is an internal authority source, then the public-private key pairs and symmetric keys are generated internally by the NWF and WF of the storage device. If a security partition is an external authority source, then the public-private key pairs and the symmetric key can be transmitted by a secure method of transmission (as defined by the SPCSet command, for example) to the storage device. This means that while certain data, such as a private key, can be written (such as by the SPCSet or by the internal key generator), the data are not read by any external process, because they are defined as hidden. It is important that the same "Write but Not Read" capability can be afforded data in any security partition that is a "Write but Not (external) Read" partition. Therefore, a user application external to the storage device can employ the storage device as a reliable place to conceal information and to perform cryptographic operations with a relatively high degree of security and secrecy.

One embodiment of the present computer security methods and systems provides for declaring SP data to be write-once. One illustrative use of this embodiment is in PKI (public key infrastructure), wherein a problem exists in validating public keys for a particular authority. The security partition of the present methods and systems can verify the source of the public key dynamically. This overcomes one of the fundamental problems in PKI known as key revocation. It is possible with the present methods and systems to have a secure means of dynamically keeping public keys current with a relatively high level of assurance. Another application of the write-once embodiment is applied to lock software to a system or disk and create logs that cannot be repudiated or accessed without authorization. In this embodiment, the storage device can be employed to read the log which may contain credit card purchase information, for example.

The present computer security embodiments typically use a fixed amount of space associated with each authority record and associated data set. In addition, one master authority record can contain the authority records for all other security partitions. For example, each authority record can use 2633 bytes of a six block (3072 byte) region, and there can be 64 possible authority records, for a total of 196,608 bytes in the security partition which contains the authority records for all security partitions. In this illustrative system, there can only be 63 user-definable security partitions. No external authority is permitted access in this embodiment except as defined by the external source of private/public/symmetric keys. This means that only an authority record defined on the storage device can be an authority permitted to read or write any other authority record and/or data set. It can be appreciated that an allowance is made in the publicly-readable, and typically factory-set, authority record header to expand or reduce this closed system of authority to more than or less than 64 total authority records.

In embodiments of the present computer security systems that maintain a finite number of authority records with a fixed-space utilization for the master authority record, the performance penalty associated with having an SP-enabled storage device can be regulated. In general, any read or write operation on the storage device checks to determine whether low-level storage addresses (e.g, cylinder, head, sector, block and the like) are protected by a security partition.

In another embodiment, the security partition region is modeled like an ATA Host Protected Area region. The partition containing the master authority record and the other authority records has a known, fixed size and uses storage hidden even from an ATA Host Protected Area call. Any partitions below the master authority record can use the top portion of the ATA Host Protected Area space. Since write and read operations in the ATA Host Protected Area space are typically rare, it can be effective to add a function to check for SP-protected regions.

In another aspect of the present methods and systems, an SPAuthHeader call returns a list of protected disk address regions. By designating a fixed region of the storage device to be the area where SP data resides, the function of checking for permitted write operations can be performed. The SPAuthHeader call returns values synthesized and stored in the extended authority partition header. It is useful for this call to report contiguous regions of the storage device that are SP-protected. In this manner, user software can be warned not to attempt to address those regions without appropriate SPOpen calls. An SPAuthHeader call may not report disk addresses to which a user does not have access.

It can be appreciated that a user-defined SP data partition can consume the entire storage capacity of the storage device if such consumption is permitted by the NWF and WF. This is one reason for restricting authority to read and write the master authority record to only predetermined users. The present system can provide authentication of these predetermined users and minimize the number of users who have administrator-level control over the authority records.

An important function of the SPAuthHeader call is to return the public key for communicating to the master authority record. This function is important because the master authority record requires public-key encryption for the passcode needed to access the master authority record. A factory distributed storage device can have a passcode structured so that software attempting to initialize the master authority record must know the passcode. The passcode is also structured so that it cannot be "sniffed" or otherwise inspected in transit because of the passcode's encryption with the master authority record's public key.

It is known that publishing a public key for encrypting passcodes can make use of the public key susceptible to a replay attack. To resist such attacks, one embodiment of the present security methods and systems includes SPNonce (which contains a "nonce") and SPAuthNonce fields in the authority record and the authority header. The nonce can be a random number up to 256 bytes in length that is intended for one-time use. In one embodiment, the nonce is encrypted with the public key as a portion of the passcode. This ensures that the sender of the passcode knows the passcode. The nonce is made a part of the authority record so that the nonce can be passed to the NWF and WF. This permits the nonce to be used to gain authority to remote storage devices through passcodes that are stored and hidden in user authority records.

For generation of keys and nonces, a random number generator can be provided in the NWF and WF. Certain storage devices, such as hard disks, afford opportunities for measuring random mechanical or electronic error that can be cultivated as a source for random numbers. The present computer security methods and systems can use this continuous random number, for example, with secure storage-to-storage transmission to create one-time pads. One-time pads are well-known perfect encryption-decryption techniques.

It can be appreciated that since an authority record can have SP data that have start times, end times, and/or instructions to remove or transfer SP data at a predetermined time, then a reliable source for clock time is needed. Benefit can be obtained by having a clock inside the storage device that can be synchronized to an external clock through a secure authorized transmission. This necessitates an additional call that has an authority record set aside or that needs use of the master authority record. By reducing the amount of time the nonce is considered to be valid, then the error in the transmitted clock time can be bounded.

A common use of a secure partition is to store the public keys of other secure partitions on other devices. In this embodiment, a secure network of storage devices can be achieved, because the passcodes that permit access to other authority records on other devices are themselves encrypted inside the storage devices. For example, it is possible to create one or more master registries that can securely manage the security partitions on a number of other storage devices.

It can be appreciated that the present computer security embodiments must deal with call authentication to secure code and data in the operating system environment. Call authentication has two general cases. In one case, it is necessary to authenticate that a computer program, for example, that is called is the correct computer program. In the other case, it is necessary to authenticate that the program or routine that calls the computer program is the correct program or routine.

Call authentication provides the basis for secure communications between code running in the operating system and the storage device authority. The general case for the operating system is to have a plurality of loader/linkers. These are operating system programs that read code from storage; assign symbolic, virtual and physical addresses; initialize values; load the code into execution memory; and can also initiate code execution.

A conventional practice is to put code authentication in the loader/linker. However, once legitimate code is authenticated, loaded and linked, intrusive code can modify the legitimate code during execution. Introduction of intrusive code can be readily performed if the code that is linked and loaded can read data from the storage device and interpret that data as a program code. Many programs have the capacity to introduce intrusive code accidentally in this manner. However, even without this capacity, there are schemes such as a conventional buffer-overflow exploit that can replace code known to be authentic with intrusive code.

Code authentication is nevertheless useful at the loader/linker level. If all reads of data that are to function as code are authenticated reads, then much of the benefit of code authentication can be realized. If buffer-overflow and similar exploits are eliminated through good programming practice, then code authentication can be an effective technique. It is well known, however, that code running in an open operating system environment often fails to conform to good security practices.

The present computer security methods and systems can provide a component for code authentication In one embodiment, one or more authority records can be employed by one or more linker/loaders to store public keys as data and check the code being loaded for authenticity. The loader/linker can therefore be certain that the public key, the hash value, and the code are authentic. The loader/linker code can be stored in non-writeable space in one authority record to ensure that its essential code is unaffected.

Code authentication can handle the call authentication problem only if all calls are made to properly authenticated code. There remains a possibility that intrusive data can be introduced that cause a call to an incorrect code segment. In an operating system where communication is defined through message passing or similar object-oriented methods, calling is done by name or handle. The authority record can be employed in a "write-once-no-delete" mode to record authenticated calls between code segments. If all code segments are authenticated, then they are coded typically to proper bound-checking standards. In this case, the call-path is authenticated and is unlikely to have a security breach.

Another method for providing call authentication involves the well-known principle of wrappering code segments. In this method, a code segment is executed within the memory space of another code segment that has been introduced either by the code compiler or the loader/linker. An example of this is the debugging function in a conventional compiler. Another example is in interpreted byte code systems. Assuming that the wrappering code is available directly from protected disk authority space, then it can provide for fully call-authenticated action by a code module. The method confirms that calls external to the code are calls to the symbolic, virtual, or physical addresses originally authenticated. For example, if a code set should not open a port to the Internet, then the wrapper provides an alarm if such a port opening was attempted. The data that records the calls permitted within the wrapper are preferably stored in a secure, non-writeable authority record.

The general solution to call authentication within the present computer security methods and systems employs the storage device to store authentication data; to perform the authentication computation; and to store special code segments from which roots of trust in the operating system environment can be established. In general, key linker/loaders and code interpreters are sufficient to establish trust on particular code operating within the operating system environment. This is an improvement over other approaches that propose radically altering the file system or securing the entire operating system environment when that environment cannot usually be completely secured. The present computer security embodiments provide key tools that can be employed to secure code execution within the operating system environment and therefore provide a scaleable solution to the call authentication problem.

Benefits/Advantages

The methods and systems discussed herein provide significant improvements and advantages for promoting computer system security that include the following benefits:

Internal security is provided for a computer system that uses a local or remote storage device for program and data. The storage device can be one or more storage devices that can reside in a single computer system. The computer systems can be connected by a bus or a network.

Protection of a computer system from network-originated attacks, particularly where the computer system relies on storage devices.

Protection of data and computer programs against unauthorized use and copying within a computer device and/or system.

Permit a storage device to secure and conceal private keys and also sign and check messages in a hidden but authenticated manner.

Upgrade of existing computer security systems in a local area or wide area enterprise that depends on electronic or electro-optic data and computer programs.

Transmission of data and computer programs to a storage device through broadband and/or narrowband unswitched and/or switched networks, so that an indication of the secure and accurate function of the data and/or computer programs in the computer system can be provided.

Transmitting, storing and managing public keys for a public key infrastructure; and for transmitting, storing, and managing private keys for cryptographic use.

Managing the integrity and rights of multimedia audio and video content across many storage devices both local area and wide area.

Providing storage security while not hampering storage device performance in normal use.

Improving use of the ANSI ATA-4 and ATA-5 Host Protected Area.

Providing assurance to the operation and integrity of an operating system across a plurality of networked computer systems; an applications system in a computer system; an applications system across a plurality of networked computer systems; a backup and recovery system in a computer system; and, a backup and recovery system across a plurality of networked computerized systems.

Permitting creation and use of one-time pad cryptography between and/or among a plurality of storage devices and/or computer systems.

Whereas particular embodiments of the invention have been described herein for the purpose of illustrating the invention and not for the purpose of limiting the same, it can be appreciated by those of ordinary skill in the art that numerous variations of the details, materials and arrangement of parts may be made within the principle and scope of the invention without departing from the invention as described in the appended claims.

The invention claimed is:

1. A storage device comprising:
a storage medium having a security partition containing at least one authority record and at least one data set associated with each of the authority records; and
a mechanism within the storage device adapted to limit access to the security partition based on the at least authority record, wherein the mechanism comprises a processor disposed within the storage device and adapted to limit access to the security partition by an operating system of a computer system, based at least in part on authentication of a passcode and a signed nonce, which are received from the operating system and verified by the mechanism according to the at least one authority record.

2. The storage device of claim 1, wherein:
the nonce is generated within the storage device and stored with the passcode in the at least one authority record.

3. The storage device of claim 2, wherein:
the nonce is generated within the storage device and provided to the operating system in response to at least one procedural call from the operating system.

4. The storage device of claim 1, wherein:
the authority record validates use of the nonce by the operating system only one time.

5. The storage device of claim 1, wherein:
the authority record comprises a public key;
the passcode provided by the operating system are encrypted by the public key; and the mechanism is adapted to decrypt the passcode using the private key.

6. A disk drive data storage device comprising:

a data storage medium comprising a data storage disk;

a secure area defined on the data storage disk, the secure area containing at least one authority record and associated data, the authority record determining access to the associated data, including an cryptographic key; and a controller within the data storage device, which is adapted to control access to the associated data based on the at least one authority record, wherein the controller is adapted to perform cryptographic operations within the disk drive data storage device using the key based on established procedure calls within the disk drive data storage device that execute cryptographic operations on behalf of, but concealed from, one or more user applications.

7. The disc drive data storage device of claim 6, wherein at least some of the cryptographic operations are unrelated to the associated data.

8. The disk drive data storage device of claim 6 wherein the controller allows only write access to the secure area for concealing information, including the cryptographic key, the controller adapted to prohibit read access to the information.

9. A system for promoting security in a computer system having an operating system in operative connection with at least one storage device, wherein said storage device includes a processor for processing data stored on said storage device, said system for promoting security comprising:

a security partition defined in the storage device and containing at least one authority record and associated data, the authority record determining access to the associated data and storage device settings, and wherein the authority record comprises at least one of a cryptographic key or hash, which authorizes at least one of reading or writing the data and storage device settings; and wherein access to the security partition in the storage device by the operating system of the computer system is limited by the processor on the storage device according to the authority record.

10. The system of claim 9, wherein the cryptographic key comprises a public key associated with the authorization.

11. The system of claim 9, wherein the device settings are stored in a writable space within the security partition.

12. The system of claim 9, wherein the at least one authority record employs a write-once-no-delete mode to record authenticated software calls.

13. A system for promoting security in a computer system having an operating system in operative connection with at least one storage device, wherein said storage device includes a processor for processing data stored on said storage device, said system for promoting security comprising:

a security partition formed in said storage device having at least one authority record comprising an authority for authorizing read operations to an associated data set and a separate authority for authorizing write operations to the associated data set; and wherein access to the security partition in the storage device by the operating system of the computer system is limited by the processor on the storage device according to the at least one authority record.

14. The system of claim 13 wherein at least one of the authorities for authorizing write and read operations implements a write but not read authorization.

\* \* \* \* \*

UNITED STATES PATENT AND TRADEMARK OFFICE
CERTIFICATE OF CORRECTION

PATENT NO.        : 7,461,270 B2                                   Page 1 of 1
APPLICATION NO. : 11/346118
DATED             : December 2, 2008
INVENTOR(S)       : Robert H. Thibadeau It is certified that error appears in the above-identified patent and that said Letters Patent is hereby corrected as shown below:

Title page,
Item (73) Assignee: replace "Seagate Technology LLC, Scotts Valley, CA (US)" with --Antique Books, Inc., Pittsburgh, PA, (US)--.

Signed and Sealed this

Seventeenth Day of November, 2009

David J. Kappos
*Director of the United States Patent and Trademark Office*